(12) United States Patent
Doi et al.

(10) Patent No.: US 11,611,285 B2
(45) Date of Patent: Mar. 21, 2023

(54) POWER CONVERTER AND AIR CONDITIONER

(71) Applicant: DAIKIN INDUSTRIES, LTD., Osaka (JP)

(72) Inventors: Hirotaka Doi, Osaka (JP); Masaki Kouno, Osaka (JP); Tomoisa Taniguchi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 252 days.

(21) Appl. No.: 16/760,623

(22) PCT Filed: Nov. 5, 2018

(86) PCT No.: PCT/JP2018/041051
§ 371 (c)(1),
(2) Date: Apr. 30, 2020

(87) PCT Pub. No.: WO2019/088294
PCT Pub. Date: May 9, 2019

(65) Prior Publication Data
US 2021/0376748 A1  Dec. 2, 2021

(30) Foreign Application Priority Data
Nov. 6, 2017 (JP) .............................. JP2017-214229

(51) Int. Cl.
*H02M 1/32* (2007.01)
*H02M 5/458* (2006.01)
(Continued)

(52) U.S. Cl.
CPC .............. *H02M 5/458* (2013.01); *H02M 1/12* (2013.01); *F25B 13/00* (2013.01); *F25B 49/025* (2013.01);
(Continued)

(58) Field of Classification Search
CPC .......... H02M 5/458; H02M 1/12; H02M 1/32; H02M 7/062; F25B 2700/1931
See application file for complete search history.

(56) References Cited

U.S. PATENT DOCUMENTS 9,240,736 B2 * 1/2016 Shimomugi ............ H02M 1/32
10,886,841 B1 * 1/2021 Brocato ................... H02M 1/32
(Continued)

FOREIGN PATENT DOCUMENTS

JP   56-49693 A    5/1981
JP   5-43800 U     6/1993
(Continued)

OTHER PUBLICATIONS

Per-Anders Gath, RIFA Electrolytics AB Sweden/UPE Inc. USA and Marty Lucas, Trenco Inc. USA (Year: 1995).*
(Continued)

*Primary Examiner* — Muhammad S Islam
(74) *Attorney, Agent, or Firm* — Birch, Stewart, Kolasch & Birch, LLP

(57) ABSTRACT

In a power converter, an inductance L of a reactor and a capacitance C of a capacitor satisfy a condition of the expression (1) below. In the power converter, a current-limiting circuit between an AC power source and the capacitor is unnecessary. Herein, αm ([A·s]) is a value of a ratio of a maximum rated current squared time product to a maximum rated output current of diodes of a rectifier circuit, Pmax is a maximum power consumption of the motor, Vac is a voltage value of a three-phase AC voltage, and a value of a constant a is 4.3

$$a \cdot C \cdot \sqrt{\frac{C}{L} \cdot \frac{Vac^3}{P_{max}}} \leq \alpha_m. \quad (1)$$

20 Claims, 8 Drawing Sheets

(51) Int. Cl.
 *H02M 1/12* (2006.01)
 *F25B 13/00* (2006.01)
 *F25B 49/02* (2006.01)

(52) U.S. Cl.
 CPC ..... *F25B 2500/07* (2013.01); *F25B 2600/021* (2013.01); *F25B 2600/0251* (2013.01); *F25B 2700/1931* (2013.01)

(56) References Cited

U.S. PATENT DOCUMENTS

| | | | | |
|---|---|---|---|---|
| 10,938,310 | B1* | 3/2021 | Cheng | H02M 3/33515 |
| 2002/0021969 | A1* | 2/2002 | Totsuka | F04C 28/08 |
| | | | | 417/42 |
| 2006/0208687 | A1* | 9/2006 | Takeoka | H02P 23/06 |
| | | | | 318/801 |
| 2009/0213513 | A1* | 8/2009 | Baudesson | H02M 5/458 |
| | | | | 361/91.5 |
| 2012/0033334 | A1* | 2/2012 | Saruwatari | H02P 29/02 |
| | | | | 361/22 |
| 2012/0113693 | A1* | 5/2012 | Sekimoto | H02M 5/458 |
| | | | | 363/37 |
| 2016/0359423 | A1 | 12/2016 | Ohta | |
| 2018/0073765 | A1* | 3/2018 | Doi | F24F 11/89 |

FOREIGN PATENT DOCUMENTS

| | | | | |
|---|---|---|---|---|
| JP | 2002-247859 | A | | 8/2002 |
| JP | 2004088865 | A | * | 3/2004 |
| JP | 2007-202378 | A | | 8/2007 |
| JP | 2010-188498 | A | | 9/2010 |
| JP | 2012-157242 | A | | 8/2012 |
| JP | 2012-235632 | A | | 11/2012 |
| JP | 2013-247784 | A | | 12/2013 |
| JP | 2015-154693 | A | | 8/2015 |
| JP | 2016-92929 | A | | 5/2016 |
| JP | 2016-208575 | A | | 12/2016 |

OTHER PUBLICATIONS

Gath et al., "Designing LC filters for AC-motor drives," Industry Applications Conference Record of the 1995 IEEE Orlando, Fl, USA, vol. 2, Oct. 8. 1995, pp. 1050-1052, XP010193117.

Hava et al., "A DC bus capacitor design method for various inverter applications," Energy Conversion Congress and Exposition (ECCE), IEEE, Sep. 15, 2012, pp. 4592-4599, XP032467027.

International Search Report (PCT/ISA/210) issued in PCT/JP2018/041051, dated Jan. 29, 2019.

* cited by examiner

POWER CONVERTER AND AIR CONDITIONER

TECHNICAL FIELD

The present disclosure relates to a power converter and an air conditioner.

BACKGROUND ART

In recent years, the configuration of a smoothing capacitor in a power converter has been studied. For example, PTL 1 (Japanese Unexamined Patent Application Publication No. S56-49693) discloses a frequency converter (power converter) having a filter for smoothing a direct current (DC) voltage.

SUMMARY OF THE INVENTION

Technical Problem

However, PTL 1 does not specifically study the capacitance of a capacitor that constitutes the filter. Here, if a smoothing capacitor with a large capacitance is employed for a power converter, the power converter may become large.

The present disclosure relates to a power converter that can reduce the size.

Solution to Problem

A power converter according to a first aspect of the present disclosure includes a rectifier circuit, an inverter, a reactor, and a capacitor. The rectifier circuit is constituted by diodes and rectifies an alternating current (AC) power of a three-phase AC power source. A value of a ratio of a maximum rated current squared time product to a maximum rated output current of the diodes is $\alpha m$ ([A·s]) The inverter inverts a voltage rectified by the rectifier circuit to an AC voltage of a predetermined frequency and applies the AC voltage to a motor a maximum power consumption of which is Pmax ([W]). The reactor is provided between the rectifier circuit and the inverter and connected in series to the rectifier circuit and the inverter. The reactor has an inductance L ([H]). The capacitor is provided between the rectifier circuit and the inverter and connected in parallel to the rectifier circuit and the inverter. The capacitor has a capacitance C ([F]). As the power converter, one in which the inductance L of the reactor and the capacitance of the capacitor satisfy a condition of the following expression (1) can be employed. Herein, Vac ([V]) indicates a voltage value of the three-phase AC power source, and a value of a constant a is 4.3. In addition, in the power converter, a current-limiting circuit between the three-phase AC power source and the capacitor is unnecessary. With such a configuration, it is possible to provide the power converter that can reduce the size with the reliability maintained.

$$a \cdot C \cdot \sqrt{\frac{C}{L} \cdot \frac{Vac^3}{P_{max}}} \leq \alpha_m \quad (1)$$

As the power converter according to the first aspect of the present disclosure, it is possible to employ one in which, when a carrier frequency used in the inverter is fc ([Hz]) and a value of a constant K is ¼, the reactor and the capacitor satisfy a condition of the following expression (2). Thus, switching noise generated in the inverter can be absorbed by the reactor and the capacitor.

$$\frac{1}{2\pi\sqrt{LC}} \leq K \cdot fc \quad (2)$$

A power converter according to a second aspect of the present disclosure includes a rectifier circuit, an inverter, a capacitor, and a control circuit. The rectifier circuit rectifies an AC power of a three-phase AC power source. The inverter inverts a voltage rectified by the rectifier circuit to an AC voltage of a predetermined frequency on the basis of input of control signals and applies the AC voltage to a motor of a compressor. The capacitor is provided between the rectifier circuit and the inverter. The control circuit stops, if an abnormal signal indicating an abnormality of a discharge pressure of the compressor is received, inputting the control signals to the inverter. In the power converter, a relay is absent between the rectifier circuit and the capacitor. With such a configuration, it is possible to provide the power converter that can reduce the size with the reliability maintained.

In the power converter according to the first aspect and the second aspect of the present disclosure, in addition to the conditions of the expressions (1) and (2), the capacitor may have the capacitance C ([F]) satisfying a condition of the following expression (3). With such a configuration, it is possible to reduce fifth and seventh harmonics.

$$C \leq 350 \times 10^{-6} \frac{Pmax}{Vac^2} \quad (3)$$

In the power converter according to the first aspect and the second aspect of the present disclosure, in addition to the conditions of the expressions (1) to (3), the capacitor may have the capacitance C ([F]) satisfying a condition of the following expression (4). Thus, it is possible to provide the power converter with a good cost balance as a whole.

$$100 \times 10^{-6} \frac{Pmax}{Vac^2} \leq C \quad (4)$$

The power converter according to the first aspect and the second aspect of the present disclosure can be used for one in which a maximum power consumption Pmax of the motor is 2 kW or more. The power converter is suitable for a product that needs a high-output motor.

In the power converter according to the first aspect and the second aspect of the present disclosure, a fuse may be provided between the three-phase AC power source and the rectifier circuit. This can prevent overcurrent from flowing in components of the power converter.

On an air conditioner according to the first aspect and the second aspect of the present disclosure, any of the above power converters is mounted. Thus, it is possible to provide a highly reliable air conditioner that can achieve reduction in size, weight, and cost.

DESCRIPTION OF EMBODIMENTS

Now, a power converter and an air conditioner according to embodiments of the present disclosure will be described with reference to drawings.

First Embodiment (1) Air Conditioner (1-1) Configuration of Air Conditioner

Figure 1:
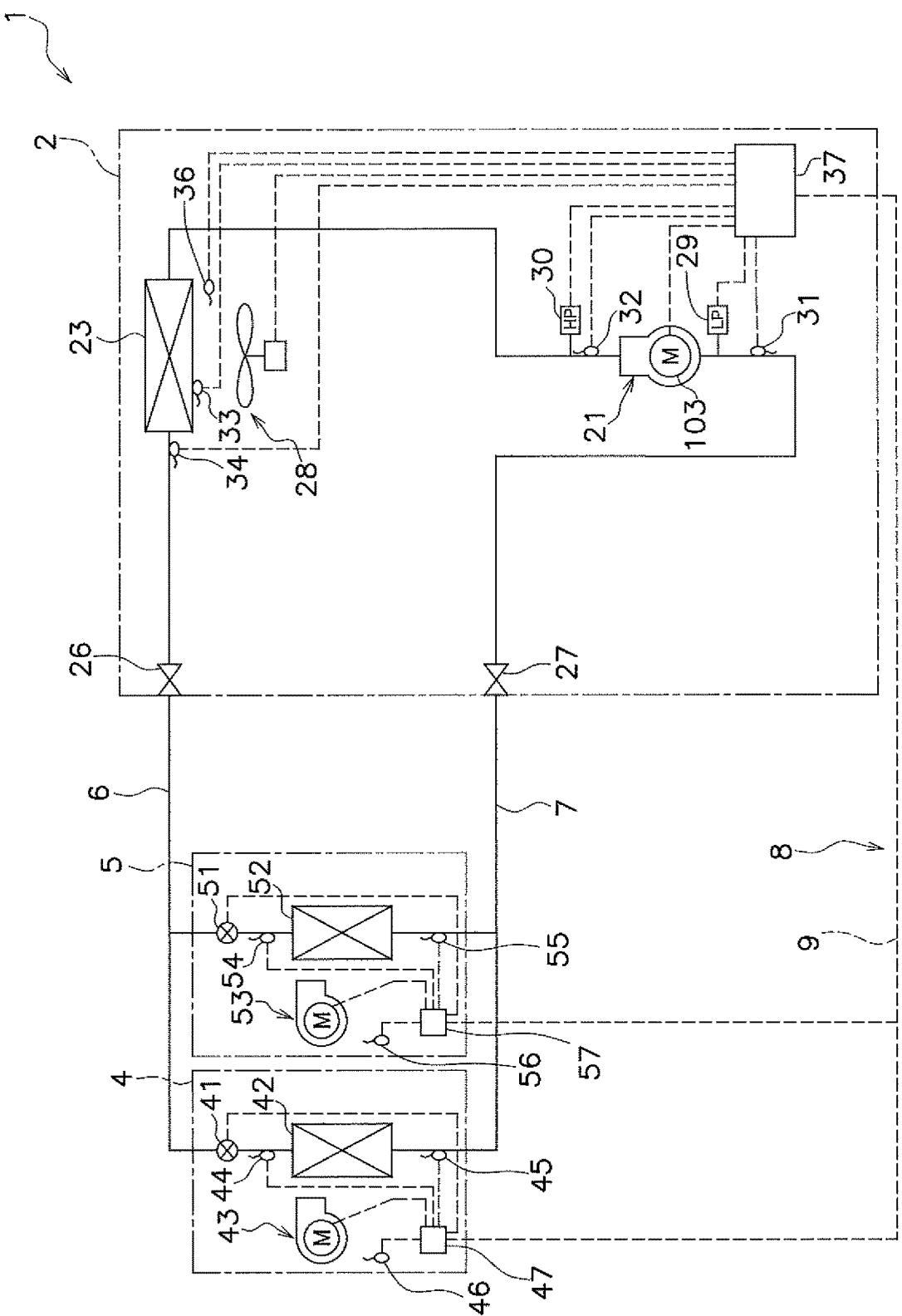
FIG. 1 is a schematic view illustrating the configuration of an air conditioner 1 according to a first embodiment of the present disclosure.

FIG. 1 is a general schematic view of an air conditioner 1 according to a first embodiment of the present disclosure. The air conditioner 1 is an apparatus that performs a vapor compression refrigeration cycle operation to be used for air conditioning inside a building or the like. The air conditioner 1 includes an outdoor unit 2 as a single heat source unit, indoor units 4 and 5 that are a plurality of (two in this embodiment) use units connected in parallel to the outdoor unit 2, and a liquid-refrigerant connection pipe 6 and a gas-refrigerant connection pipe 7 as refrigerant connection pipes that connect the outdoor unit 2 and the indoor units 4 and 5.

Here, the air conditioner 1 is constituted to be dedicated to cooling operation and does not have a heating operation function. Thus, the outdoor unit 2 does not include a four-way switching valve and an accumulator. In addition, an expansion mechanism on the outdoor unit side is not included.

Note that the indoor unit 4 and the indoor unit 5 have substantially the same configuration. In the following description, each unit of the indoor unit 5 is denoted by reference numerals in fifties instead of reference numerals in forties denoting each unit of the indoor unit 4, and description thereof is omitted.

The outdoor unit 2 is placed outside a building or the like and is connected to the indoor units 4 and 5 via the liquid-refrigerant connection pipe 6 and the gas-refrigerant connection pipe 7. The outdoor unit 2 mainly includes a compressor 21, an outdoor heat exchanger 23 as a heat-source-side heat exchanger, a liquid-side shutoff valve 26, a gas-side shutoff valve 27, an outdoor fan 28, and an outdoor-side control unit 37.

The compressor 21 is a compressor that can change an operation capacity. Herein, the compressor 21 is driven by a motor 103. A number of revolutions Rm of the motor 103 is controlled by a motor driver (a power converter 105) described later. The outdoor unit 2 further includes various sensors such as a suction pressure sensor 29, a discharge pressure sensor 30, a suction temperature sensor 31, a discharge temperature sensor 32, a heat-exchange temperature sensor 33, a liquid-side temperature sensor 34, and an outdoor temperature sensor 36. The discharge pressure sensor 30 detects a discharge pressure of the compressor 21.

The outdoor-side control unit 37 is constituted by a microcomputer and a memory, in which the motor driver that controls the motor 103 is incorporated.

The indoor unit 4 includes an indoor expansion valve 41 as an expansion mechanism, an indoor heat exchanger 42 as a use-side heat exchanger, an indoor fan 43, and an indoor-side control unit 47. The indoor unit 4 further includes various sensors such as temperature sensors 44 and 45 that detect the temperature of refrigerant and an indoor temperature sensor 46. The indoor-side control unit 47 is constituted by a microcomputer, a memory, and the like and can individually operate the indoor unit 4. In addition, the indoor unit 4 transceives a control signal or the like with a remote controller (not illustrated) and transceives a control signal or the like with the outdoor unit 2 via a transmission line 9. Herein, the outdoor-side control unit 37 and the indoor-side control unit 47 are connected via the transmission line 9, and the set constitutes a control unit 8 that controls the operation of the air conditioner 1.

(1-2) Operations of Air Conditioner (Cooling Operation)

Next, operations of the air conditioner 1 according to this embodiment are described. The air conditioner 1 according to this embodiment is a cooling dedicated apparatus and performs cooling operation.

During cooling operation, each indoor heat exchanger 42 functions as an evaporator so as to reduce the temperature of indoor air. Specifically, during cooling operation, the discharge side of the compressor 21 is connected to the gas side of the outdoor heat exchanger 23, and the suction side of the compressor 21 is connected to the gas side of the indoor heat exchanger 42 via the gas-side shutoff valve 27 and the gas-refrigerant connection pipe 7. In addition, during cooling operation, the liquid-side shutoff valve 26 and the gas-side shutoff valve 27 are controlled to be in an open state. The opening degree of each indoor expansion valve 41 is adjusted so that a degree of superheating of refrigerant at the exit of the indoor heat exchanger 42 (i.e., gas side of the indoor heat exchanger 42) becomes constant at a target degree of superheating.

In such a state of a refrigerant circuit, when the compressor 21, the outdoor fan 28, and the indoor fan 43 are started, a low-pressure gas refrigerant is sucked into the compressor 21 and is compressed to become a high-pressure gas refrigerant. The high-pressure gas refrigerant is sent to the outdoor heat exchanger 23 and is condensed through heat exchange with outdoor air supplied by the outdoor fan 28 to become a high-pressure liquid refrigerant.

The high-pressure liquid refrigerant is sent to the indoor unit 4 via the liquid-side shutoff valve 26 and the liquid-refrigerant connection pipe 6. The high-pressure liquid refrigerant sent to the indoor unit 4 is decompressed by the indoor expansion valve 41 to become substantially equal to the suction pressure of the compressor 21 to become a low-pressure refrigerant in a gas-liquid two-phase state and is sent to the indoor heat exchanger 42. The refrigerant in a gas-liquid two-phase state is evaporated through heat exchange with indoor air in the indoor heat exchanger 42 to become a low-pressure gas refrigerant. At this time, the temperature of indoor air is decreased. In addition, the low-temperature gas refrigerant is sent to the outdoor unit 2 via the gas-refrigerant connection pipe 7 and is sucked into the compressor 21 again.

(2) Motor Driver

The motor driver according to this embodiment includes the power converter 105 and drives the motor 103 mounted on the compressor 21 of the above-described air conditioner 1.

Figure 2:
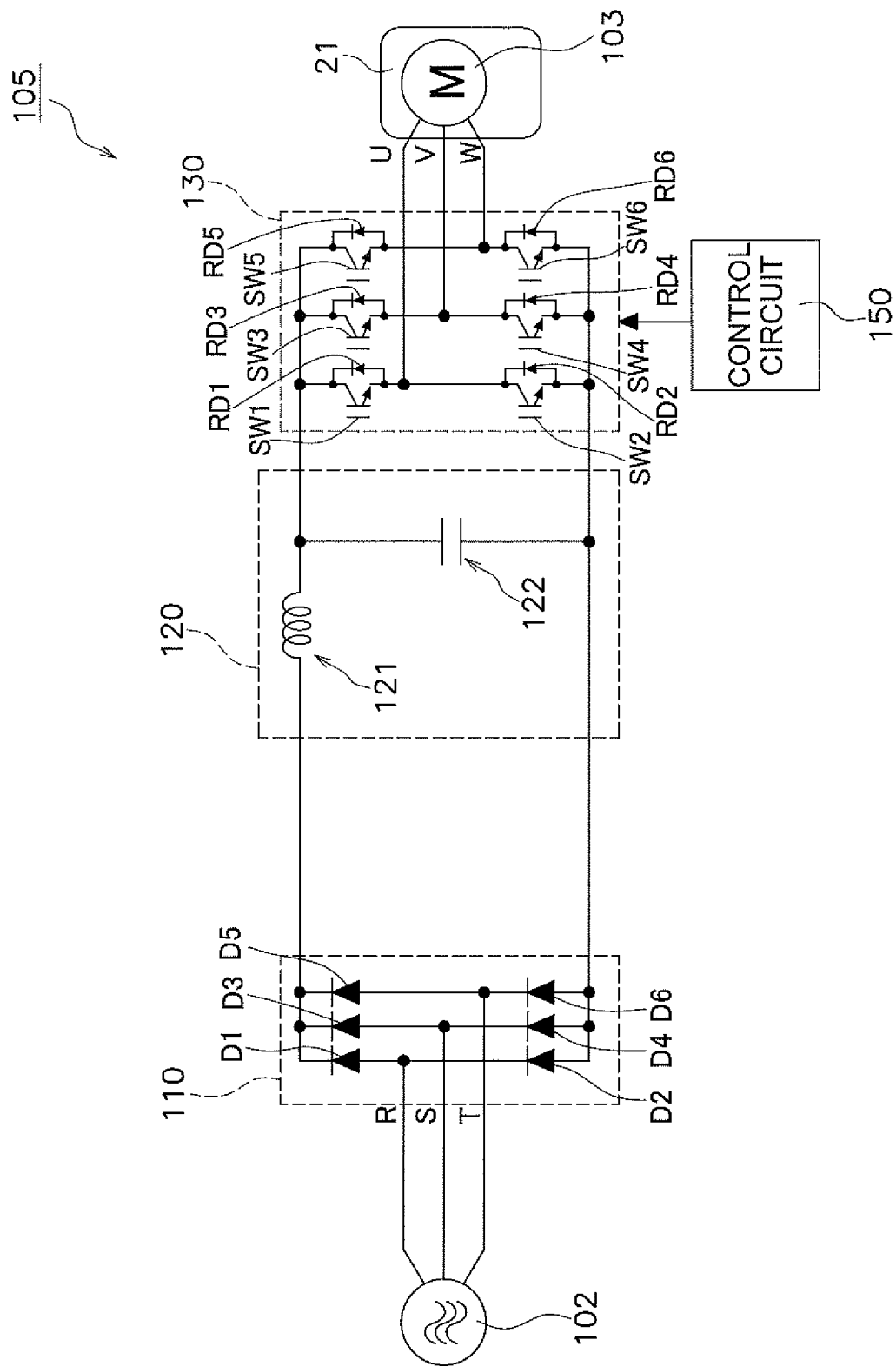
FIG. 2 is a schematic view illustrating the configuration of a power converter 105 according to the first embodiment of the present disclosure.

As illustrated in FIG. 2, the power converter 105 includes a rectifier circuit 110, a DC link unit 120, an inverter 130, and a control circuit 150. The power converter 105 converts power supplied from an AC power source 102 to a predetermined frequency and applies the power to the motor 103. Herein, the motor 103 is a three-phase AC motor and has a maximum power consumption Pmax ([W]) of 2 kW or more. The motor 103 as above is used for driving the compressor 21 provided in the refrigerant circuit of the air conditioner 1, for example.

In addition, in the power converter 105 a current-limiting circuit between the AC power source 102 and a capacitor 122 is unnecessary. Details will be described later. In addition, the power converter 105 can be mounted on a printed board. The printed board is connected to the AC power source 102 via a harness.

The AC power source 102 supplies power to the power converter 105 and the motor 103 via a harness or the like. Specifically, the AC power source 102 is a so-called commercial three-phase AC power source and supplies an AC voltage Va ([V]) having a frequency of 50 Hz, 60 Hz, or the like.

The rectifier circuit 110 is connected to the AC power source 102 and converts the AC voltage Vac ([V]), output from the AC power source 102, to a DC voltage Vdc ([V]) through full-wave rectification. Specifically, the rectifier circuit 110 is constituted by a diode bridge circuit in which six diodes D1 to D6 are wired in a bridge configuration. The diodes D1 and D2 are connected in series, the diodes D3 and D4 are connected in series, and the diodes D5 and D6 are connected in series. The node between the diodes D1 and D2 is connected to an R-phase output from the AC power source 102. The node between the diodes D3 and D4 is connected to an S-phase output from the AC power source 102. The node between the diodes D5 and D6 is connected to a T-phase output from the AC power source 102. The rectifier circuit 110 rectifies the AC voltage Vac output from the AC power source 102 and outputs the rectified voltage to the DC link unit 120. Note that the value of a ratio of a maximum rated current squared time product to a maximum rated output current of the diodes D1 to D6 of the rectifier circuit 110 is herein αm ([A·s]).

The DC link unit 120 is provided between the rectifier circuit 110 and the inverter 130 and is constituted by using at least the capacitor 122. Herein, the DC link unit 120 is constituted by a reactor 121 and the capacitor 122.

The reactor 121 is provided between the rectifier circuit 110 and the inverter 130 and connected in series to the rectifier circuit 110 and the inverter 130. The reactor 121 has an inductance L ([H]).

The capacitor 122 is provided between the rectifier circuit 110 and the inverter 130 and connected in parallel to the rectifier circuit 110 and the inverter 130. That is, a terminal of the capacitor 122 is connected to the positive-side output terminal of the rectifier circuit 110 through the reactor 121, and the other terminal thereof is connected to the negative-side output terminal of the rectifier circuit 110. In addition, a DC voltage (hereinafter also referred to as a DC link voltage Vdc ([V]) generated across the capacitor 122 is connected to input nodes of the inverter 130.

Herein, as the capacitor 122, one not having a function of smoothing the waveform pulsation of the voltage rectified by the rectifier circuit 110 (voltage fluctuation due to the AC voltage Vac ([V])) is employed. On the other hand, as the capacitor 122, one having a function of smoothing switching noise from the inverter 130 is employed. Thus, while the capacitance of the capacitor 122 is suppressed, for example, a power factor can be improved by switching control of the inverter. Note that the expression "not having a function of smoothing the waveform pulsation of the voltage rectified by the rectifier circuit 110" means that, while the motor is driven with a rated output, 80% or more pulsation components included in a waveform obtained by rectifying an AC voltage remains across the capacitor.

As described above, since the capacitor 122 does not have a function of smoothing the waveform pulsation of the voltage rectified by the rectifier circuit 110, the capacitor 122 with a small capacitance can be employed. However, since the capacitance C ([F]) of the capacitor 122 is small, the DC link voltage Vdc ([V]) output from the DC link unit 120 pulsates. For example, in a case where the AC power source 102 is a three-phase AC power source, the DC link voltage Vdc ([V]) pulsates at a frequency six times as high as a power source frequency. The capacitor 122 as above is implemented by a capacitor other than an electrolyte capacitor, such as a film capacitor.

Furthermore, the inventors have studied optimization of the capacitance C ([F]) of the capacitor 122 and have acquired the knowledge that the values of the inductance L ([H]) of the reactor 121 and the capacitance C ([F]) of the capacitor 122 preferably satisfy the following expression (1) in order to prevent overcurrent from flowing in the rectifier circuit 110. Here, the value of a constant a is 4.3.

$$a \cdot C \cdot \sqrt{\frac{C}{L} \cdot \frac{Vac^3}{P_{max}}} \leq \alpha_m \qquad (1)$$

Note that the inventors have also acquired the knowledge that the values of the inductance L ([H]) of the reactor 121 and the capacitance C ([F]) of the capacitor 122 preferably satisfy the following expression (2) in order to have the inverter 130 absorb a switching noise. Here, fc ([Hz]) is a carrier frequency, which will be described later, and the value of a constant K is ¼.

$$\frac{1}{2\pi\sqrt{LC}} \leq K \cdot fc \qquad (2)$$

On the basis of input of gate control signals, the inverter 130 inverts the voltage Vdc rectified by the rectifier circuit 110 to an AC voltage of a predetermined frequency and applies the voltage to the motor 103. Herein, input nodes of the inverter 130 are connected in parallel to the capacitor 122 of the DC link unit 120. In addition, the inverter 130 switches output of the DC link unit 120 to convert the output to three-phase AC.

To output three-phase AC to the motor 103, the inverter 130 includes six switching elements SW1 to SW6. Specifically, the inverter 130 includes three switching legs formed by connecting two switching elements in series to each other, and in each of the switching legs, respective nodes between the upper-arm switching elements SW1, SW3, and SW5 and the lower-arm switching elements SW2, SW4, and SW6 are connected to coils of corresponding phases (U phase, V phase, W phase) of the motor 103. In addition, freewheeling diodes RD1 to RD6 are connected in antiparallel to the switching elements SW1 to SW6, respectively. In addition, the inverter 130 switches the DC link voltage Vdc input from the DC link unit 120 by on/off operation of these switching elements SW1 to SW6 and converts the DC link voltage Vdc to a three-phase AC voltage to supply the voltage to the motor 103. Note that the on/off operation is controlled by the control circuit 150. In addition, each of the switching elements SW1 to SW6 is implemented by, for example, an insulated gate bipolar transistor (IGBT).

The control circuit 150 performs various controls in the power converter 105. Specifically, the control circuit 150 controls the on/off operation of the switching elements SW1 to SW6 of the inverter 130 to drive the motor 103. At this time, the control circuit 150 outputs gate control signals for the on/off operation of the switching elements SW1 to SW6 of the inverter 130 such that current of each phase (U phase, V phase, W phase) that flows in the motor 103 pulsates in synchronization with the pulsation of the DC link voltage Vdc. Note that the control circuit 150 generates the gate control signals by using the carrier of the carrier frequency fc ([Hz]).

(3) Characteristics 3-1

As described above, as the power converter 105 according to this embodiment, one in which the inductance L ([H]) of the reactor 121 and the capacitance C ([F]) of the capacitor 122 satisfy the condition of the expression (1) is employed. This can prevent overcurrent from flowing in the rectifier circuit 110. In addition, in the power converter 105, a current-limiting circuit between the AC power source 102 and the capacitor 122 is unnecessary.

Figure 3:
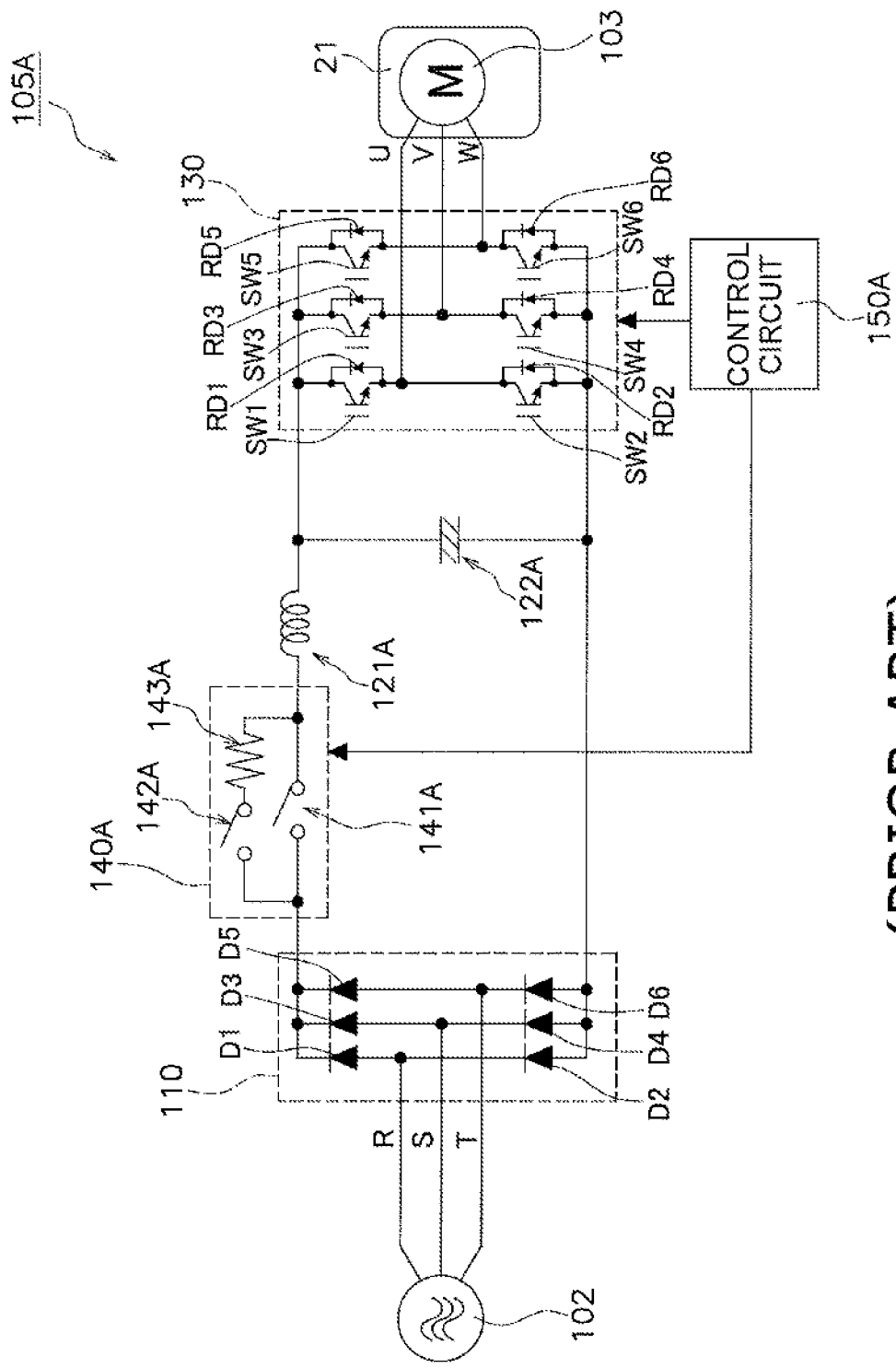
FIG. 3 is a schematic view illustrating the configuration of a power converter 105A of the related art.

For a supplementary note, a power converter 105A of the related art is provided with a current-limiting circuit 140A as illustrated in FIG. 3. The current-limiting circuit 140A is provided between the rectifier circuit 110 and a smoothing capacitor 122A, for example. In addition, an electrolyte capacitor is used as the smoothing capacitor 122A. In this case, since the capacitance of the smoothing capacitor 122A is large, when the power of the power converter 105A is turned on, inrush current may be generated in the power converter 105A. The current-limiting circuit 140A is provided to prevent such inrush current. Specifically, when the power is turned on, the current-limiting circuit 140A is controlled by a control circuit 150A such that a main relay 141A is turned off and a current-limiting relay 142A is turned on. Thus, current flows in a resistor 143A, and the smoothing capacitor 122A is charged with inrush current suppressed. Subsequently, after charge is accumulated in the smoothing capacitor 122A, the current-limiting circuit 140A is controlled by the control circuit 150A such that the current-limiting relay 142A is turned off and the main relay 141A is turned on. In this manner, it is possible to prevent inrush current from being generated in the power converter 105A.

In the power converter 105 according to this embodiment, the capacitor 122 is not an electrolyte capacitor and is implemented by a capacitor other than an electrolyte capacitor, such as a film capacitor, which satisfies the condition of the expression (1). Thus, it is possible to prevent inrush current from being generated and to eliminate the need for a current-limiting circuit as described above. As a result, the power converter 105 achieves a long life and high reliability.

If the smoothing capacitor 122A with a large capacitance is employed for the power converter 105, high-frequency components of a power source current may increase, the power factor may decrease, and the executing current and peak current may increase, for example. By contrast, since a capacitor other than an electrolyte capacitor, such as a film capacitor, is used in the power converter 105 according to this embodiment, the motor 103 can be controlled without degrading the reliability.

3-2

In addition, in the power converter 105 according to this embodiment, the reactor 121 and the capacitor 122 satisfy the condition of the expression (2). Thus, switching noise generated in the inverter 130 can be absorbed by the reactor and the capacitor.

3-3

In addition, the power converter 105 according to this embodiment can be used for one in which the maximum power consumption Pmax ([W]) of the motor 103 is 2 kW or more. Thus, the power converter 105 is suitable for a product that needs a high-output motor. It is also applicable to the air conditioner 1 for a building.

3-4

In addition, on the air conditioner 1 according to this embodiment, the power converter 105 having any of the above characteristics is mounted. Thus, the reliability of the air conditioner 1 can be increased, and reduction in size, weight, and cost can be achieved.

In addition, the air conditioner 1 according to this embodiment is constituted to be dedicated to cooling operation. Thus, a compact air conditioner can be provided.

Figure 4:
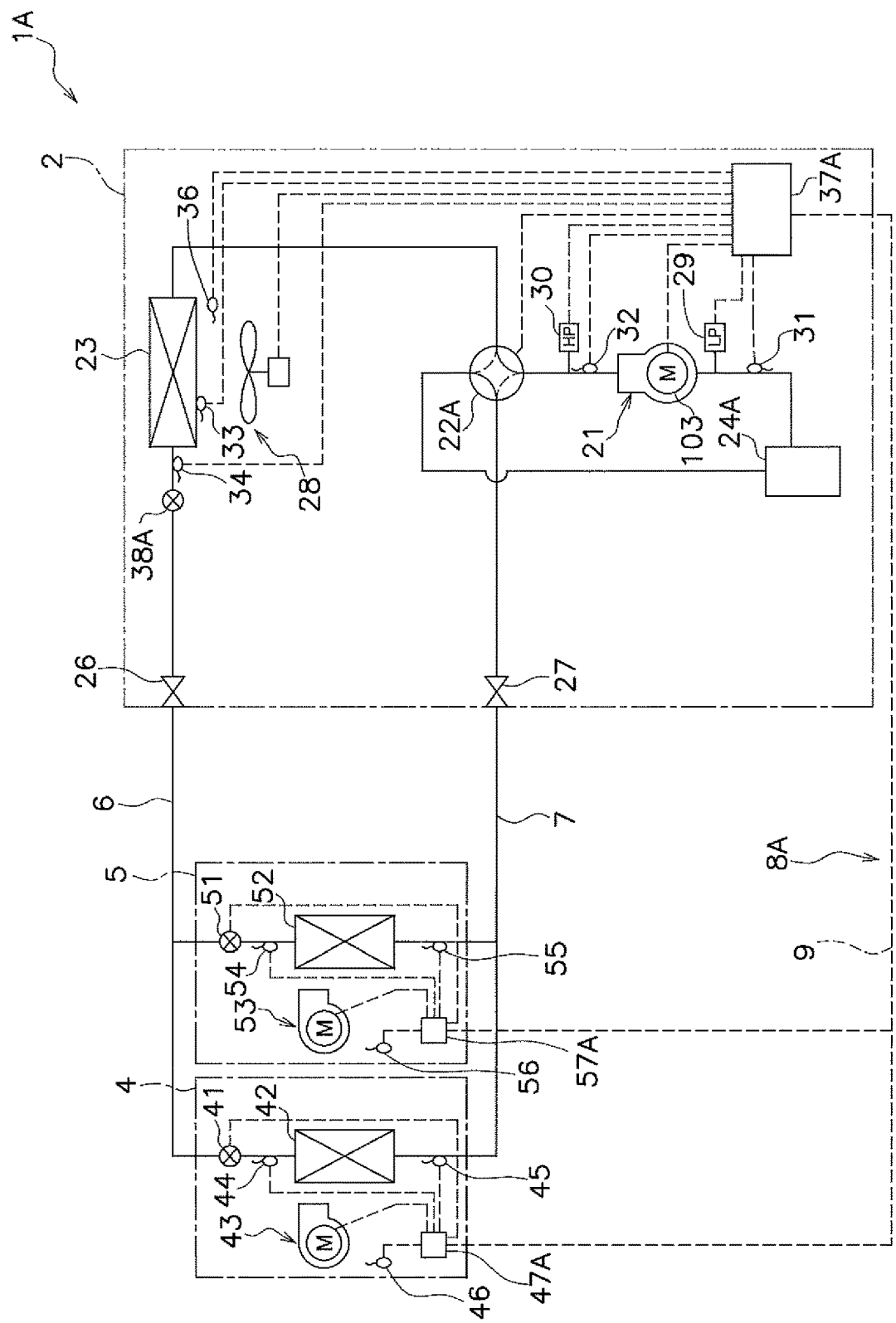
FIG. 4 is a schematic view illustrating the configuration of an air conditioner 1A for comparison.

For a supplementary note, in a case where the air conditioner performs heating operation, for example, in addition to cooling operation, it is necessary to form a refrigerant circuit as illustrated in FIG. 4. That is, in such an air conditioner 1A, as illustrated in FIG. 4, it is necessary to further include a four-way switching valve 22A, an accumulator 24A, and an expansion valve 38A, for example. The four-way switching valve 22A is used for changing the direction in which refrigerant flows. The accumulator 24A is used for absorbing a difference between refrigerant amounts used for cooling operation and heating operation. The expansion valve 38A is used for adjusting the flow rate during heating operation in the outdoor unit 2.

In comparison with the air conditioner 1A as above, the air conditioner 1 according to this embodiment can be formed to be more compact without mounting these components.

(4) Modification Examples (4-1) Modification Example 1A

In the above embodiment, it is also possible to employ one in which the value of the capacitance C ([F]) of the capacitor 122 further satisfies the condition of the following expression (3) to the three-phase AC motor having a maximum power consumption Pmax of 2 kW or more. Through the study, the inventors have acquired the knowledge that when this condition is satisfied, a fifth harmonic and a seventh harmonic from the rectifier circuit 110 can be reduced.

$$C \leq 350 \times 10^{-6} \frac{P\max}{Vac^2} \quad (3)$$

(4-2) Modification Example 1B

In addition, in the above embodiment, it is also possible to employ one in which the value of the capacitance C ([F]) of the capacitor 122 further satisfies the condition of the following expression (4). Through the study, the inventors have acquired the knowledge that when this condition is satisfied, even if the capacitance C ([F]) of the capacitor 122 is reduced, the function of smoothing switching noise from the inverter 130 can be maintained. The inventors have also acquired the knowledge that capacitor 122 as above can suppress the capacitance of the reactor 121. Thus, it is possible to provide the power converter 105 with a good cost balance as a whole.

$$100 \times 10^{-6} \frac{P\max}{Vac^2} \leq C \quad (4)$$

(4-3) Modification Example 1C

Figure 5:
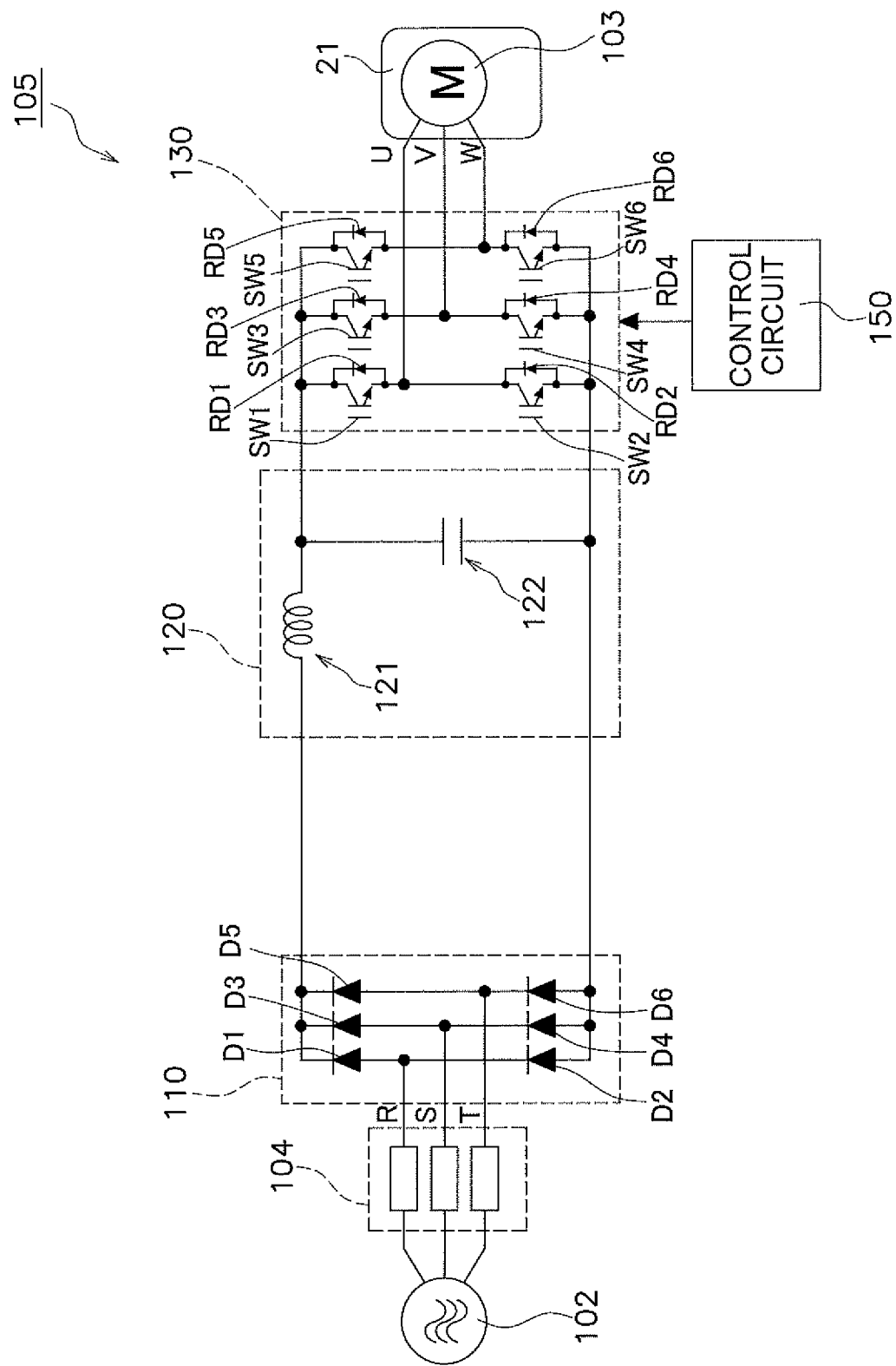
FIG. 5 is a schematic view illustrating the configuration of the power converter 105 according to Modification Example 1C.

As illustrated in FIG. 5, the power converter 105 according to this embodiment may further include a fuse 104. This can prevent overcurrent from flowing in components of the power converter 105.

For a supplementary note, in this embodiment, it is unnecessary to provide a relay (e.g., the above main relay 141A) between the AC power source 102 and the motor 103. Thus, in a case where the fuse 104 is not provided, it is not possible to separate a power source system of the motor 103 from the AC power source 102. Since the power converter 105 according to Modification Example 1C includes the fuse 104 even in this case, it is possible to separate the power source system of the motor 103 from the AC power source 102 at the time of abnormality, and the safety can be increased. In other words, the power converter 105 according to Modification Example 1C, even if the main relay 141A is unnecessary, reduction in size of the power converter 105 can be achieved with the safety maintained.

(4-4) Modification Example 1D

Figure 6:
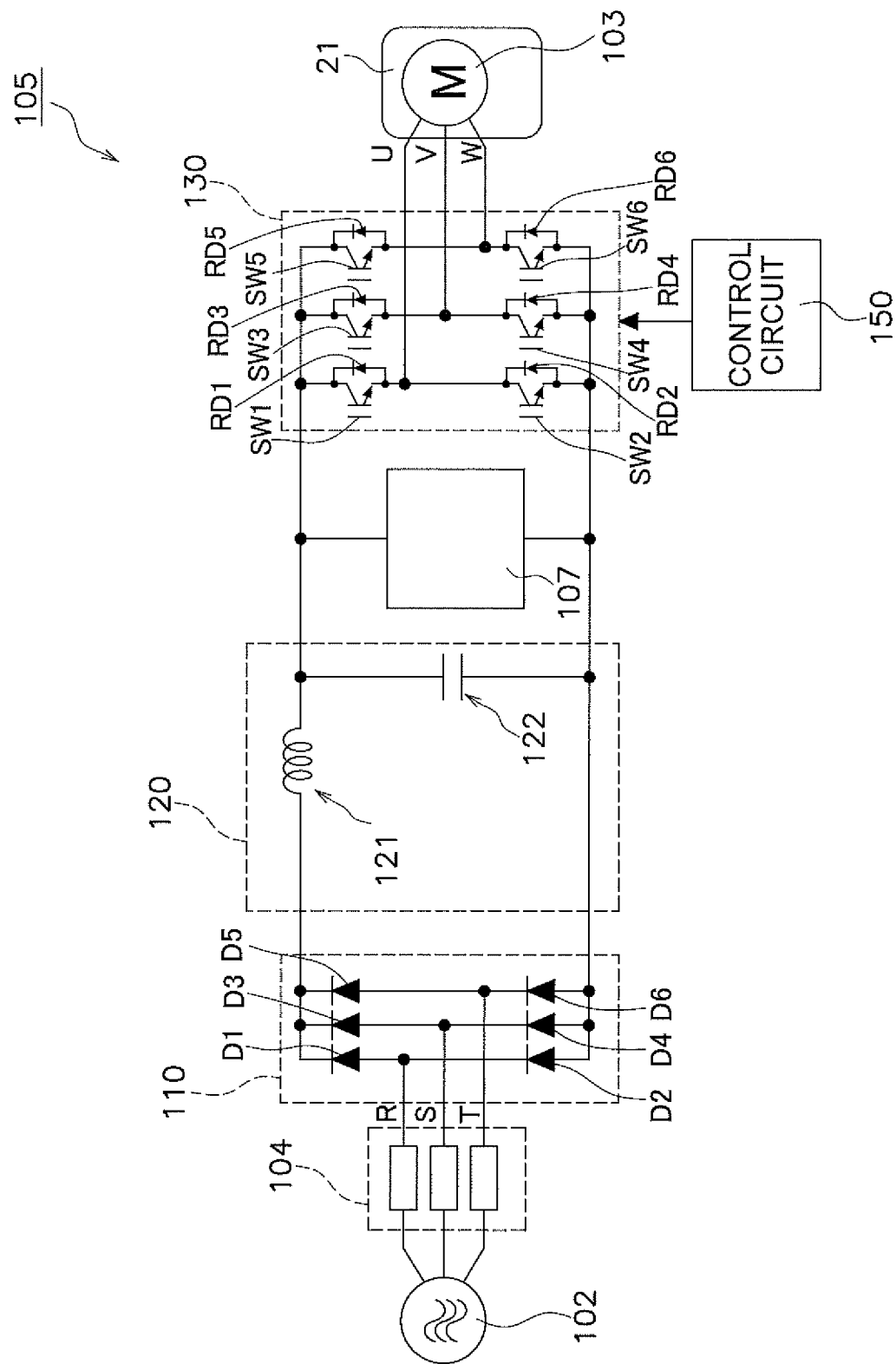
FIG. 6 is a schematic view illustrating the configuration of the power converter 105 according to Modification Example 1D.

As illustrated in FIG. 6, the power converter 105 according to this embodiment may further include a surge voltage clamp circuit 107. The surge voltage clamp circuit 107 absorbs a regenerative power of the motor 103. In addition, since the surge voltage clamp circuit 107 absorbs switching noise, the capacitance C of the capacitor 122 can be further reduced. As a result, it is possible to reduce the size with the safety of the power converter 105 maintained.

(4-5) Modification Example 1E

The above embodiment has described an example in which the air conditioner 1 performs only cooling operation.

However, the air conditioner 1 according to this embodiment is not limited to this. That is, the air conditioner may perform heating operation, for example, in addition to cooling operation. In this case, as illustrated in FIG. 4, the air conditioner further includes the four-way switching valve 22A, the accumulator 24A, and the expansion valve 38A, for example. In addition, cooling operation and heating operation are switched by a control unit 8A constituted by an outdoor-side control unit 37A and an indoor-side control unit 47A.

Second Embodiment (5) Motor Driver 5-1

A motor driver according to a second embodiment of the present disclosure includes a power converter 105S. In the following description, the same parts as the parts described above are denoted by substantially the same reference numerals, and repeated description is omitted. Note that a suffix S may be added in this embodiment in order to be distinguished from the other embodiment.

In this embodiment, an outdoor-side control unit 37S of the outdoor unit 2 further includes a discharge pressure abnormality detecting unit 37L. The discharge pressure abnormality detecting unit 37L outputs an "abnormal signal" to the power converter 105S if the discharge pressure of the compressor 21 becomes higher than or equal to a threshold.

Figure 7:
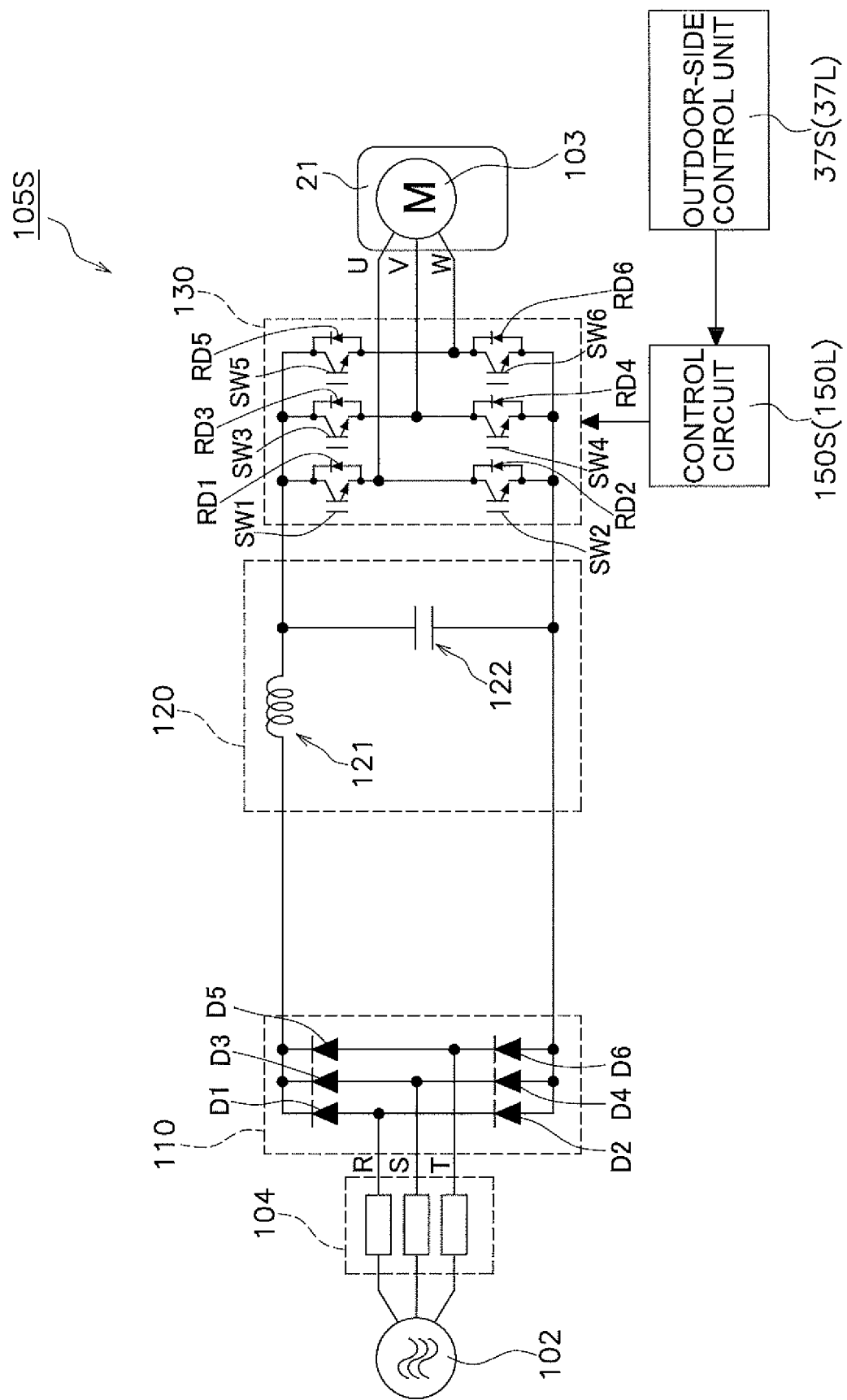
FIG. 7 is a schematic view illustrating the configuration of a power converter 105 according to a second embodiment of the present disclosure.

In addition, as illustrated in FIG. 7, the power converter 105S according to this embodiment includes the rectifier circuit 110, the inverter 130, the capacitor 122, and a control circuit 150S. In addition, the control circuit 150S includes an abnormality stopping unit 150L in addition to the configuration and functions of the control circuit 150 in the first embodiment. Regardless of the presence or absence of a relay between the AC power source 102 and the capacitor 122, if an abnormal signal indicating an abnormality of the discharge pressure of the compressor 21 is received, the abnormality stopping unit 150L stops inputting gate control signals to the inverter 130.

5-2

Figure 8:
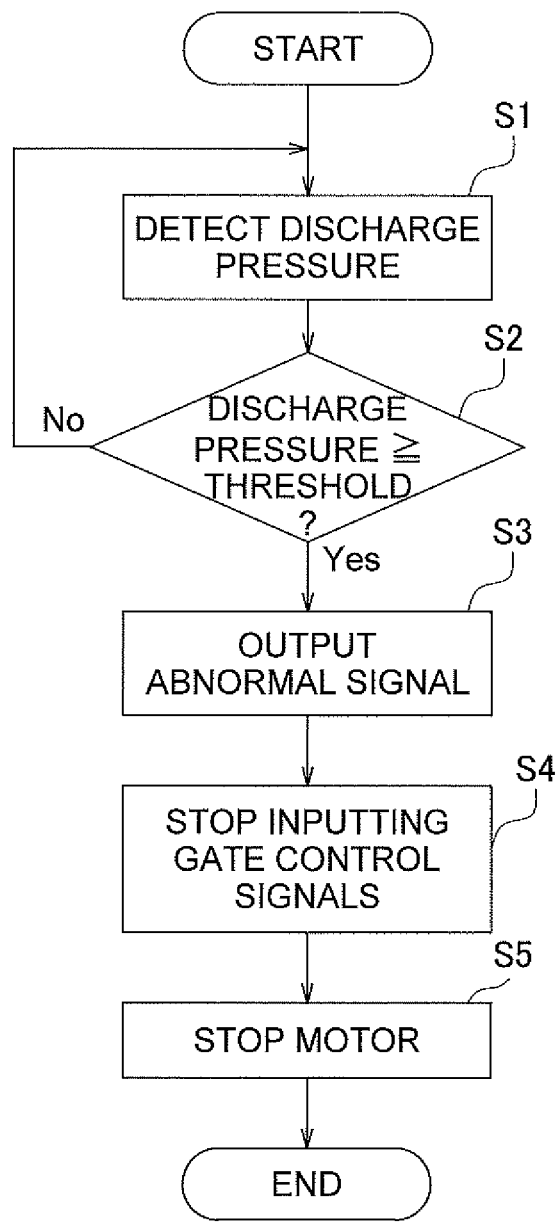
FIG. 8 is a flowchart for illustrating the operation of the power converter 105S according to the second embodiment.

FIG. 8 is a flowchart for illustrating the operation of the power converter 105S according to this embodiment.

The discharge pressure sensor 30 detects the discharge pressure of the compressor 21 as needed (S1). Information of the discharge pressure is transmitted to the outdoor-side control unit 37S as needed.

The outdoor-side control unit 37S (the discharge pressure abnormality detecting unit 37L) determines whether the discharge pressure of the compressor 21 is higher than or equal to a threshold as needed. Subsequently, if the outdoor-side control unit 37 (the discharge pressure abnormality detecting unit 37L) determines that the discharge pressure becomes higher than or equal to the threshold (S2—Yes), an abnormal signal is output to the power converter 105S (S3).

Upon reception of the abnormal signal from the discharge pressure abnormality detecting unit 37L, in the power converter 105S, the control circuit 150 (the abnormality stopping unit 150L) stops inputting gate control signals to the inverter 130 (S4).

Thus, the switching elements SW1 to SW6 of the inverter 130 are stopped, and the motor 103 is stopped (S5).

(6) Characteristics

6-1

As described above, in the power converter 105S according to this embodiment, regardless of the presence or absence of a relay between the AC power source 102 and the capacitor 122, if an abnormal signal indicating an abnormality of the discharge pressure of the compressor 21 is received, the control circuit 150S stops inputting control signals to the inverter 130. With such a configuration, it is possible to provide the power converter 105S that can reduce the size with the reliability maintained.

For a supplementary note, in a case where a relay between the AC power source 102 and the capacitor 122 is absent, it is not possible to separate the power source system of the motor 103 from the AC power source 102. Thus, if the discharge pressure of the compressor 21 indicates an abnormal value, for example, it may not be possible to execute an emergency stop using the relay. Even in such a case, the power converter 105S according to this embodiment stops inputting control signals to the inverter 130 at the time of abnormality, and thus, the safety can be increased. In other words, the power converter 105S according to this embodiment can eliminate the need for a relay and can reduce the size with the safety maintained.

6-2

In addition, as the power converter 105S according to this embodiment, one in which the inductance L ([H]) of the reactor 121 and the capacitance C ([F]) of the capacitor 122 satisfy the condition of the expression (1) is employed. This can prevent overcurrent from flowing in the rectifier circuit 110.

6-3

In addition, as the power converter 105S according to this embodiment, one in which the inductance L ([H]) of the reactor 121 and the capacitance C of the capacitor 122 have ([F]) satisfying the condition of the expression (2) is employed. Thus, switching noise generated in the inverter 130 can be absorbed by the reactor 121 and the capacitor 122.

6-4

In addition, the power converter 105S according to this embodiment can be used for one in which the maximum power consumption Pmax ([W]) of the motor 103 is 2 kW or more. Thus, the power converter 105S is suitable for a product that needs a high-output motor. It is also applicable to an air conditioner that can perform air conditioning of a whole building, for example.

6-5

In addition, on the air conditioner 1 according to this embodiment, the power converter 105S having any of the above characteristics is mounted. Thus, the reliability of the air conditioner 1 can be increased, and reduction in size, weight, and cost can be achieved.

In addition, the air conditioner 1 according to this embodiment is constituted to be dedicated to cooling operation. Thus, a compact air conditioner can be provided. Details are the same as those of Characteristics (3-4).

(7) Modification Examples

(7-1) Modification Example 2A

In the above embodiment, it is also possible to employ one in which the value of the capacitance C ([F]) of the capacitor 122 further satisfies the condition of the expression (3) to the three-phase AC motor having a maximum power consumption Pmax of 2 kW or more. Details are the same as those of Modification Example 1A.

(7-2) Modification Example 2B

In addition, in the above embodiment, it is also possible to employ one in which the value of the capacitance C ([F]) of the capacitor 122 further satisfies the condition of the expression (4). Details are the same as those of Modification Example 1B.

(7-3) Modification Example 2C

The power converter 105S according to this embodiment may further include a fuse. This can prevent overcurrent from flowing in components of the power converter 105S. Details are the same as those of Modification Example 1C.

(7-4) Modification Example 2D

The power converter 105S according to this embodiment may further include the surge voltage clamp circuit 107. Details are the same as those of Modification Example 1D.

(7-5) Modification Example 2E

The above embodiment has described an example in which the air conditioner 1 performs only cooling operation. However, the air conditioner 1 according to this embodiment is not limited to this. That is, the air conditioner 1 may perform heating operation, for example, in addition to cooling operation. Details are the same as those of Modification Example 1E.

Other Embodiments

While the embodiments have been described above, it should be understood that various modifications can be made to the configurations and details without departing from the spirit and scope of the claims.

That is, the present disclosure is not limited to the embodiments described above. The present disclosure can be embodied, in the stage of implementation, by modifying components without departing from the gist thereof. In addition, the present disclosure can form various disclosures by appropriate combinations of the plurality of components disclosed in the above embodiments. For example, some components may be eliminated from all the components described in the embodiments. Furthermore, components in different embodiments may be combined as appropriate.

REFERENCE SIGNS LIST 1 air conditioner
8 control unit
21 compressor 22A four-way switching valve
24A accumulator
37 outdoor-side control unit
37A outdoor-side control unit
38A expansion valve
47 indoor-side control unit
47A indoor-side control unit
102 AC power source (three-phase AC power source)
103 motor
104 fuse
105 power converter
105A power converter
105S power converter
107 surge voltage clamp circuit
110 rectifier circuit
120 DC link unit
121 reactor
122 capacitor
130 inverter
140A current-limiting circuit
141A main relay
142A current-limiting relay
143A resistor
150 control circuit
150A control circuit
150S control circuit
150L abnormality stopping unit
D1 diode
D2 diode
D3 diode
D4 diode
D5 diode
D6 diode
SW1 switching element
SW2 switching element
SW3 switching element
SW4 switching element
SW5 switching element
SW6 switching element

CITATION LIST

Patent Literature

[PTL 1] Japanese Unexamined Patent Application Publication No. S56-49693

The invention claimed is:

1. A power converter comprising:
a rectifier circuit that rectifies an alternating current power of a three-phase AC power source, said rectifier circuit being constituted by diodes for which a value of a ratio of a maximum rated current squared time product to a maximum rated output current is am ([A·s]);
an inverter that inverts a voltage rectified by the rectifier circuit to an AC voltage of a predetermined frequency and that applies the AC voltage to a motor a maximum power consumption of which is Pmax;
a reactor that is provided between the rectifier circuit and the inverter and connected in series to the rectifier circuit and the inverter and that has an inductance L; and
a capacitor that is provided between the rectifier circuit and the inverter and connected in parallel to the rectifier circuit and the inverter and that has a capacitance C,
wherein, when a voltage value of the three-phase AC power source is Vac and a value of a constant a is 4.3, the inductance L of the reactor and the capacitance C of the capacitor satisfy a condition of the following expression (1) to prevent an overcurrent from flowing in the rectifier circuit, and
wherein a current-limiting circuit between the three-phase AC power source and the capacitor is unnecessary $$a \cdot C \cdot \sqrt{\frac{C}{L}} \cdot \frac{Vac^3}{P_{max}} \leq \alpha_m. \tag{1}$$

2. The power converter according to claim 1,
wherein, when a carrier frequency used in the inverter is fc and a value of a constant K is ¼, the reactor and the capacitor satisfy a condition of the following expression (2)

$$\frac{1}{2\pi\sqrt{LC}} \leq K \cdot fc. \tag{2}$$

3. A power converter comprising:
a rectifier circuit that rectifies an alternating current power of a three-phase AC power source;
an inverter that inverts a voltage rectified by the rectifier circuit to an AC voltage of a predetermined frequency on the basis of input of control signals and that applies the AC voltage to a motor of a compressor;
a capacitor that is provided between the rectifier circuit and the inverter; and
a control circuit that stops, if an abnormal signal indicating an abnormality of a discharge pressure of the compressor is received, inputting the control signals to the inverter, wherein
a relay is absent between the rectifier circuit and the capacitor, and
the control circuit receives the abnormal signal for stopping the input of the control signals to the inverter, upon a determination that the discharge pressure of the compressor is higher than or equal to a threshold.

4. The power converter according to claim 1,
wherein the capacitor has the capacitance C satisfying a condition of the following expression (3)

$$C \leq 350 \times 10^{-6} \frac{Pmax}{Vac^2}. \tag{3}$$

5. The power converter according to claim 1,
wherein the capacitor has the capacitance C satisfying a condition of the following expression (4)

$$100 \times 10^{-6} \frac{Pmax}{Vac^2} \leq C. \tag{4}$$

6. The power converter according to claim 1,
wherein a maximum power consumption Pmax of the motor is 2 kW or more.

7. The power converter according to claim 1,
wherein a fuse is provided between the three-phase AC power source and the rectifier circuit.

8. An air conditioner on which the power converter according to claim 1.

9. The power converter according to claim 2,
wherein the capacitor has the capacitance C satisfying a condition of the following expression (3)

$$C \leq 350 \times 10^{-6} \frac{P\max}{Vac^2}. \tag{3}$$

10. The power converter according to claim 3,
wherein the capacitor has the capacitance C satisfying a condition of the following expression (3)

$$C \leq 350 \times 10^{-6} \frac{P\max}{Vac^2}. \tag{3}$$

11. The power converter according to claim 2,
wherein the capacitor has the capacitance C satisfying a condition of the following expression (4)

$$100 \times 10^{-6} \frac{P\max}{Vac^2} \leq C. \tag{4}$$

12. The power converter according to claim 3,
wherein the capacitor has the capacitance C satisfying a condition of the following expression (4)

$$100 \times 10^{-6} \frac{P\max}{Vac^2} \leq C. \tag{4}$$

13. The power converter according to claim 4,
wherein the capacitor has the capacitance C satisfying a condition of the following expression (4)

$$100 \times 10^{-6} \frac{P\max}{Vac^2} \leq C. \tag{4}$$

14. The power converter according to claim 2,
wherein a maximum power consumption Pmax of the motor is 2 kW or more.

15. The power converter according to claim 3,
wherein a maximum power consumption Pmax of the motor is 2 kW or more.

16. The power converter according to claim 4,
wherein a maximum power consumption Pmax of the motor is 2 kW or more.

17. The power converter according to claim 5,
wherein a maximum power consumption Pmax of the motor is 2 kW or more.

18. The power converter according to claim 2,
wherein a fuse is provided between the three-phase AC power source and the rectifier circuit.

19. The power converter according to claim 3,
wherein a fuse is provided between the three-phase AC power source and the rectifier circuit.

20. The power converter according to claim 4,
wherein a fuse is provided between the three-phase AC power source and the rectifier circuit.

* * * * *